United States Patent [19]

Rona

[11] 3,920,582

[45] Nov. 18, 1975

[54] SOLID CATALYST FOR HETEROGENEOUS REACTIONS

[75] Inventor: Peter Rona, Haifa, Israel

[73] Assignee: IMI (TAMI) Institute for Research & Developement, Haifa, Israel

[22] Filed: Jan. 4, 1974

[21] Appl. No.: 430,804

[30] Foreign Application Priority Data
Jan. 17, 1973 Israel.................................. 41330

[52] U.S. Cl............. 252/430; 252/428; 260/614 R; 260/641
[51] Int. Cl.²...................... B01J 31/02; B01J 31/26
[58] Field of Search........................... 252/428, 430

[56] References Cited
UNITED STATES PATENTS

| | | | |
|---|---|---|---|
| 1,777,459 | 10/1930 | Baddiley et al. | 252/428 X |
| 2,731,502 | 1/1956 | Smith | 252/430 X |
| 3,454,502 | 7/1969 | Hiltgen et al. | 252/428 |
| 3,764,548 | 10/1973 | Redmore | 252/430 X |

*Primary Examiner*—Patrick P. Garvin
*Attorney, Agent, or Firm*—Ladas, Parry, Von Gehr, Goldsmith & Deschamps

[57] ABSTRACT

Catalyst for carrying out heterogeneous catalytic chemical reactions. The catalyst is a composite comprising a solid carrier and at least one sulfonic acid with at least two sulfonic groups per molecule. The catalyst is prepared by impregnating a solid carrier with at least one sulfonic acid of the kind specified and the resulting product is dried and baked and, if desired, steamed in an inert gas stream. Examples of catalytic reactions that are successfully carried out with such a catalyst are the production of alcohols by hydration of olefins and the production of ethers by dehydration of alcohols.

11 Claims, No Drawings

SOLID CATALYST FOR HETEROGENEOUS REACTIONS

The present invention concerns acidic catalysis or organic reactions. More particularly, the invention concerns acidic solid catalysts for heterogeneous acidic catalysis of organic reactions, i.e., reactions that proceed in the vapour phase in the presence of a solid catalyst.

Examples or organic reactions which are promoted by acidic catalysis and in respect of which the present invention is applicable are hydration of olefins, dehydration of alcohols to olefins and/or to ethers, formation of esters from olefins and acids, alkylation, arylation, isomerization and polymerization of olefins, alkylation of phenols to ethers and alkylphenols. These examples are not meant to limit in any way the scope of applicability of the present invention.

For acidic catalysis in solution it is quite common to use sulfonic acids which combine good solubility with a strong acidity. For example, paratoluene sulfonic acid is an extremely versatile acid catalyst used in solution to promote a host of acid catalysed reactions such as trans-esterification, enol-ether formation, ketalysation, acetylation, dehydration, isomerization, etc. Furthermore, methane di-sulfonic acid and methane tri-sulfonic acid have been stated to catalyse the alkylation of phenols in solution.

In many cases, heterogeneous catalysis by solid catalysts is advantageous, among others for the reason that from a heterogeneous system the catalyst is easily regained and also the recovery of the product is simpler than in case of a homogeneous system. Indeed many acidic solid catalysts are known, both of the type in which the acidity stems from the chemical composition of the solid and of the type in which the acidity is the consequence of the presence of a liquid acid absorbed to the surface of a solid carrier. Thus there are known catalysts prepared by the adsorption of phosphoric acid onto the surface of solids and such catalysts are used, for example, in the manufacture of alcohols by direct hydration of olefins, and in the alkylation, arylation and polymerization of olefins. These catalysts are not entirely satisfactory since they tend to lose some of their catalytic activity as a consequence of the depletion of the phosphoric acid content of the solid, due to entrainment of some of the phosphoric acid in the gas streams carrying the reactants, which in turn is the result of the loose-type association which generally exists between the phosphoric acid and the solid carrier.

A similar difficulty has been observed with known catalysts consisting of boron trifluoride adsorbed on anhydrous inorganic oxides.

The decrease in the concentration of the adsorbed acidic component in this type of catalyst, caused by the entrainment of the acidic component in the reacting gas streams, reduces the activity of the catalyst. To counter this reduction of catalyst activity it is generally required to replenish the acid lost by entrainment. Also in the technological applications of these catalysts for vapour phase reactions measures must be taken to alleviate corrosion caused by the entrained acid in the hot gaseous reaction streams.

Acidic solid catalysts of the second type referred to above, i.e., those in which the acidity is a consequence of the composition and structure of the solid itself, do not suffer from depletion of the acidic component. Thus, acidic oxides such as tungsten oxide alone or admixed with other oxides are solid catalysts known to catalyse some of the reactions mentioned above, e.g. hydration of ethylene. Also heteropolyacids such as silicotungstic acid on silica gel have been stated to be useful for the same purpose. Some acidic catalysts of this second type exhibit only at relatively high temperatures as appreciable activity to catalyse vapour phase chemical transformation, while others, due to their high activity, are not selective with respect to their catalytic activity even at low temperatures. Thus, for example, the relatively drastic conditions of 250°C temperature and 100 atmospheres pressure are required for the hydration of propylene to isopropanol over a silica-alumina catalyst, while the silicotungstic acid catalyst mentioned above brings about extensive polymerization of propylene when used as a catalyst in the hydration of propylene to isopropanol at a temperature exceeding 180°C. Below 180°C the catalytic activity of this catalyst is not very pronounced. It should also be noted in this context that side reactions such as coking and polymerization, which may occur with a catalyst of low selectivity, tend to cause deactivation of the catalyst with an ensuing loss in its capacity to promote the desired chemical reaction. This second type of solid acidic catalysts is thus also of limited applicability.

There are also known solid catalysts for heterogeneous reactions in which sulfuric acid and/or oxides of sulfur are supported on solid carriers. For example, a catalyst prepared by oxidizing $SO_2$ to $SO_3$ in a furnace containing the support has been reported to promote isomerization of hydrocarbons; a catalyst prepared by soaking a porous support in dilute sulfuric acid and drying the product obtained has been reported to catalyse esterification of lower acrylic acids; a catalyst obtained by spraying a support with dilute sulfuric acid has been reported to be useful to obtain diaryl methanes; and a catalyst prepared by passing a stream of $SO_3$ through silica gel has been reported to be useful for the vapour phase hydration of olefins. All these catalysts suffer from the same drawback as those based on phosphoric acid in that the adsorbed sulfuric acid or sulfur trioxide is entrained by the gaseous phase with ensuing reduction and eventual total loss of catalytic activity. For example, it has been shown that a catalyst consisting of 12% by weight of sulfuric acid supported on diatomaceous earth pellets employed in the vapour phase dehydration of n-butanol to the corresponding ether completely lost its activity after 4 hours and that this loss of activity was due to the entrainment of the sulfuric acid in the vapour stream passing over the catalyst.

There are known ion exchange resins in which a sulfonic acid group is attached to a polymeric backbone such as, for example, a resin resulting from the copolymerization of vinyl sulfonic acid $CH_2=CHSO_3H$, or crotyl sulfonic acid $CH_3—CH=CHSO_3H$, with divinyl benzene as cross-linking agent. Such resins are not known to be applied in industrial practice as heterogeneous catalysts in organic reactions of the type specified hereinbefore. Attempts have been made in laboratories to use such resins as catalysts in hydration of propylene at a temperature of 135°C. However, even at this low temperature degradation of the resin due to desulfonation was reported to occur, and at a higher temperature the rate of this undesirable loss of active sites increased, leading to deactivation of the resin with concomitant decrease in the conversion of propylene to isopropanol. Moreover, due to the low permissible operative temperature all work involving use of ion exchange resins as catalysts was carried out in liquid phase with exceptionally high water-to-propylene feed ratios in the range of 10:1 to 60:1, which is an additional serious drawback in practical catalytic work. The above drawbacks have so far imposed serious limitations on the application of heterogeneous acidic catalysis of organic reactions, notwithstanding the fact that such a catalysis, if successful, is of substantial economic advantage.

In accordance with the invention there is provided a solid catalyst for heterogeneous catalytical chemical reactions being a composite comprising a solid carrier and at least one sulfonic acid with at least two sulfonic groups per molecule.

The sulfonic acid component of the catalyst according to the invention is applied to the carrier by impregnation, e.g., by soaking the dry carrier in an aqueous solution of a sulfonic acid or a mixture of such acids.

After the impregnation of the carrier with sulfonic acid(s) the resulting product is dried and baked. It is sometimes desirable to reduce the activity of the catalyst by steaming at 150°–200°C in an inert gas stream for periods up to 80 hours to constant weight.

The carrier material must be compatible with all the reactants and products under operating conditions and should remain solid under these conditions; it should preferably have a large specific surface. Examples of materials applicable as carriers are inorganic oxides such as alumina, silica, boria, zirconium dioxide, silica-alumina, silica-alumina-zirconia, various naturally occurring inorganic oxides of various grades of purity, such as diatomaceous earth, attapulgus clay, bentonite. It is also possible to use acids based on any of the above oxides as well as their salts. Also, active carbons of various origins such as animal charcoal, graphite and the like may be used.

The carriers may be used in the form of pellets, chips or granules for fixed bed application, or in the form of small particles suitable for fluidized bed use.

It is also possible in accordance with the invention to compact a powderous catalyst according to the invention into a body of any desired shape, e.g., for the purpose of fitting it as a compact body into a specific piece of apparatus.

As a rule the sulfonic acid content of a catalyst according to the invention will amount to 0.5 to 60% of the net carrier weight, the range of 10–30% by weight being the preferred one. The term "net carrier weight" used herein means the weight of the carrier material prior to the impregnation thereon of the sulfonic acid(s).

The use of a solid acidic catalyst with sulfonic groups as a heterogeneous catalyst in vapour phase reactions was far from obvious notwithstanding the fact that it had been known prior to this invention to use sulfonic acids as catalysts in solution, i.e., in a homogeneous system. This is so because the requirements of stability, activity, selectivity, solubility, volatility, etc., are in the case of heterogeneous catalysts at times of an entirely different order of magnitude and may even be diametrically opposed to the same requirements in the case of a homogeneous catalyst. Thus, for example, a compound to be applied as a catalyst in solution is generally required to be soluble in the solvent used, whereas solubility of an active component of a heterogeneous catalyst in the gaseous reactants and products as well as the carrier gas, if any, is undesirable. Furthermore, as mentioned above, polymeric sulfonic acid ion exchange resins have been shown to be impractical for heterogeneous catalysis. In view of all this it could not have been anticipated that an insoluble material with sulfonic acid groups, i.e., with active sites that are chemically related to soluble sulfonic acids will have a catalytic effect superior to that of the latter and consequently be useful as an improved heterogeneous catalyst.

The solid heterogeneous catalysts according to the invention excel over known solid acidic catalysts in having a higher activity, in enabling the application of lower reaction temperatures, as well as in higher degrees of specifity and selectivity which in turn reduces the side reactions and leads to the production of purer products.

The invention is illustrated by the following Examples, without being limited thereto. In the Examples:

"Space Velocity" means the number of "volumes" of gas calculated at NTP, passing through the catalyst bed in a specified period of time, "volume" being defined as equal to the apparent volume of the catalyst bed.

$$\text{"Mole percent conversion"} = \frac{\text{moles of product formed}}{\text{moles of theoretically formed product}} \times 100$$

$$\text{"Percent selectivity"} = \frac{\text{moles of product formed}}{\text{moles of reactant converted}} \times 100$$

EXAMPLE 1

Diatomaceous earth pellets (dimensions 4 × 7 mm) were dried at 80°C under vacuum for 2 hours. To 55 g of dry pellets in an evacuated flask a solution of 16.8 g of methane disulfonic acid in 50 ml of water was added and the mixture was kept for 30 minutes at 80°C under atmospheric pressure. Following this treatment, 25 ml of the water was evaporated in a rotatory evaporator and the pellets were filtered off from the remaining solution using a coarse porcelain filter. The pellets were dried at 140°C for 6 hours and baked at 200°C for an additional 6 hours. Following the baking the pellets were cooled in a dessicator. The product consists of grey pellets showing a weight gain of 13.6% on the net carrier weight.

EXAMPLE 2

Silica-alumina pellets (dimensions 2.5 × 5 mm) containing 12% alumina, were dried under vacuum in the manner described in Example 1. A solution of 14 g of benzene-1,3-disulfonic acid in 50 ml water was added to 50 g dry silica-alumina pellets in an evacuated flask, and the mixture was heated for 30 minutes at 80°C at atmospheric apressure. After 25 ml of the water was distilled off in a rotatory evaporator the catalyst particles were separated from the remaining solution by filtration on a coarse porcelain filter and were dried for 6 hours at 150°C. This material was baked at 200°C for 6 hours. The product is 60 g of grey pellets. The weight gain obtained was 20% on the net carrier weight.

EXAMPLE 3

Silica gel granules (Tayler mesh size on 15) were dried in a manner similar to that described in Example 1 and to 26 g of the dry granules contained in an evacuated flask a solution of 8.15 g methane trisulfonic acid in 50 ml water was added. This mixture was heated to 80°C for 30 minutes at atmospheric pressure. Following the above treatment, the flask was transferred to a rotatory evaporator and 30 ml of the water were distilled off, then the granules were filtered off from the solution that was left in the flask, using a coarse porcelain filter. The granules so obtained were dried for 6 hours at 150°C and baked at 200°C for 6 hours, The product so obtained is a dark grey granular material weighing 29.66 g. The weight gain obtained was 14% on the net carrier weight.

Thermogravimetric analysis was performed on each of the catalysts described in Examples 1, 2 and 3. None of the materials exhibited weight loss, corresponding to thermal decomposition, below a temperature of 280°C, which indicates thay they are thermally stable below 280°C.

EXAMPLE 4

A prior art catalyst was prepared for comparison purposes as follows: diatomaceous earth pellets (dimensions 2 × 5 mm) weighing 100 g placed in a flask were dried at 80°C under vacuum for 2 hours. To the dry pellets, under vacuum, a solution of sulfuric acid made up from 54 ml concentrated sulfuric acid and 213 ml water, was added and the mixture was heated at 80°C at atmospheric pressure for 1 hour. Following this treatment the pellets were filtered off using a coarse porcelain filter and were dried at 140°C for 5 hours and baked at 200°C for an additional 5 hours. Orange coloured pellets weighing 112 g were obtained. The weight of the product corresponds to 12% gain on the net carrier weight.

EXAMPLE 5

A further prior art catalyst was prepared for comparative purposes as follows: a portion of 26 g silica gel granules (Tayler mesh size on 15) was dried in a manner similar to that described in Example 1. To the dry granules in a flask under vacuum a solution of 8.15 g methane sulfonic acid in 50 ml water was added and the mixture was heated at atmospheric pressure for 30 minutes at 80°C. Following this treatment the flask containing the above mixture was attached to a rotatory evaporator and 30 ml of the water were distilled off. After this stage the granules were filtered off from the remaining solution using a coarse procelain filter. The granules obtained were dried at 150°C for 6 hours and then baked at 200°C for the same period of time. The product obtained consists of white granules; its weight of 28.75 g corresponded to 10.5% gain on the net carrier weight.

The products of Examples 4 and 5 were investigated by thermogravimetric analysis and exhibited a continuous weight loss on heating above 200°C. This finding indicates that the materials are thermally unstable above 200°C.

EXAMPLE 6

The catalysts of Examples 1 to 3 were tested for a total of 12 to 24 hours for activity in the vapour phase hydration of ethylene to ethyl alcohol. Test conditions were: 25 ml catalyst charged in a tubular glass reactor placed in a vertical position in an oven kept at 195°C, a mixture of steam and ethylene at 1:1 molar ratio was passed through the reactor tube at atmospheric pressure at a total hourly space velocity at 1500. The vapours leaving the reactor were condensed and analyzed by gas chromatography for ethyl alcohol content. All catalysts tested gave 0.3 to 0.5 mole percent conversion of ethylene to ethanol. Traces of ethyl ether, corresponding to less than 0.02 mole percent conversion were also produced. The dilute ethyl alcohol solutions obtained using the above catalysts were all neutral, indicating the absence of any acidic material removed from the catalyst into the vapour stream. All catalysts obtained were stable and did not show any loss of activity during the above test periods.

The prior art catalyst of Example 5 was tested under identical conditions for its activity in the vapour phase hydration of ethylene. With this catalyst strongly acidic solutions were obtained immediately after the experiment was started, indicating the release of acid from the catalyst under the experimental conditions, which in turn shows that this material is unstable and thus does not possess the improved stability of the catalysts obtained from alkyl - or arylsulfonic acids containing more than one sulfonic acid group which were shown above to produce ethanol solutions devoid of acid content, under identical conditions. On continuing the said experiment (with the catalyst prepared from methane sulfonic acid) the catalyst gradually lost its activity to become inactive within two hours on stream.

EXAMPLE 7

A catalyst obtained from methane trisulfonic acid and diatomaceous earth pellets (dimensions 4 × 7 mm), containing the organic material in an amount corresponding to a 19% gain on the net carrier weight, was employed in the vapour phase dehydration of n-butanol to di-n-butyl ether. The apparatus consisted of a glass tube packed with the catalyst with a layer of glass beads being placed on the top of the catalyst layer, serving as preheater. The catalyst tube was inserted in a vertical oven and was equipped with a condenser and a flask to collect the product as well as a pump to transfer the n-butanol to the top of the column and a line equipped with a rotameter to introduce a controlled flow of argon. In the experiment n-butanol at hourly liquid space velocity of 0.6 was pumped onto the top of the catalyst column while a stream of 6 liters per hour was flown through the same column. The column was kept at a temperature of 150°C. The n-butanol on entering the hot column was vaporized and the vapours were swept in the argon stream over the catalyst layer. In an experiment carried out in this manner over a period of 4 hours 17.4 mole percent conversion of the n-butanol to di-n-butyl ether was obtained. Product composition was determined by gas chromatographic analysis. No loss of catalyst activity was observed during the experiment and the product did not contain any acidic material released from the catalyst. No dehydration to butenes was detected during the experiment.

EXAMPLE 8

The prior art catalyst of Example 4 was tested in n-butanol to di-n-butyl ether dehydration in a manner identical to that described above. The catalyst gave 17.0 mole percent conversion to di-n-butyl ether in the initial 30 minutes on stream. However immediately at the outset of the experiment a strongly acidic product was obtained indicating catalyst composition. On continuing the experiment the conversion gradually dropped and after 4 hours on stream the catalyst became totally inactive. This loss of catalytic activity is a consequence of the entrainment of the active component of the catalyst, sulfuric acid, in the gaseous reactant stream whereby the catalyst is gradually depleted of sulfuric acid.

EXAMPLE 9

Two additional prior art catalysts were prepared as follows:

a. Diatomaceous earth pellets (dimensions 4 × 7 mm) were dried at 80°C under vacuum for two hours. A portion of 40 g of the dry pellets was treated with a solution of 15 g benzene sulfonic acid in 85 ml water and was dried and baked, exactly according to the experimental procedure described in Example 1. The product obtained consists of yellow pellets — 45.5 g, corresponding to 11.4 weight percent material deposited on the support.

b. Silica gel granules (Tayler mesh size on 15) were dried as in Example 1. A portion of 9 g of the dry granules was treated with a solution of 3.5 g of benzene sulfonic acid in 25 ml water, dried and baked. Experimental procedures were performed exactly as described in Example 1. The product obtained is a dark material — 9.8 g, corresponding to 8.8 weight percent supported phase deposited on the silica gel carrier.

Both of the above materials were tested with respect to their activity in the vapour phase hydration of ethylene to ethanol. Test conditions were the same as those described in Example 6. The condensates obtained after passing the steam-ethylene mixture (in the vapour phase) over the catalysts were highly acidic in both cases indicating extensive catalyst decomposition. The products contained traces of ethanol in the beginning of the tests.

EXAMPLE 10

The catalyst of Example 3 was employed in the vapour phase hydration of ethylene to ethanol. The reaction was carried out in an elevated pressure continuous reactor apparatus equipped with a vertical reactor containing a fixed bed of 50 ml of the above catalyst. The following reaction conditions were employed:

| | |
|---|---|
| Temperature | 190 — 215°C |
| Pressure | 165 — 190 PSIA |
| Space velocity | 1700 — 2000 Hr$^{-1}$ |
| Water to ethylene mole ratio | 1.0:1.0 — 1.6:1.0 |

In a 117 hour continuous experiment 1.8 to 2.4 mole percent ethylene to ethanol conversions were obtained. Ethanol was obtained in the form of 2.9 to 3.6 weight percent aqueous solutions. Selectivity was 92 to 96 percent, with ethyl ether produced as a by-product.

EXAMPLE 11

The catalyst of Example 1 was employed in the vapour phase hydration of propylene to isopropanol. The reaction was carried out in the same reactor apparatus as in Example 10, under the following conditions: n

| | |
|---|---|
| Temperature | 170 — 195°C |
| Pressure | 120 — 140 PSIA |
| Space velocity | 1550 — 2380 Hr$^{-1}$ |

Water to propylene ratio 0.5:1.0 — 1.2:1.0 In a 65 hour continuous test 4.5 to 6.2 mole percent propylene to isopropanol conversions were obtained. Isopropanol was obtained in the form of 11.8 to 23.7 weight percent aqueous solutions. The selectivity was 89 to 93 percent with isopropyl ether produced as the by-product.

I claim:

1. A solid catalyst for heterogeneous catalytical chemical reactions being a composite consisting essentially of a solid carrier and at least one hydrocarbyl sulfonic acid with at least two sulfonic groups per molecule.

2. A catalyst according to claim 1, wherein the carrier is an inorganic oxide.

3. A catalyst according to claim 2, wherein the carrier is silica.

4. A catalyst according to claim 1, wherein the carrier is diatomaceous earth.

5. A catalyst according to claim 2, wherein the carrier is silica-alumina.

6. A catalyst according to claim 1, wherein the carrier is active carbon or graphite.

7. A catalyst according to claim 1, wherein said sulfonic acid is methane disulfonic acid.

8. A catalyst according to claim 1, wherein said sulfonic acid is methane trisulfonic acid.

9. A catalyst according to claim 1, wherein said sulfonic acid is benzene-1, 3-disulfonic acid.

10. Process of preparing a catalyst composite consisting essentially of a solid carrier and at least one hydrocarbyl sulfonic acid with at least two sulfonic groups per molecule, wherein said solid carrier is impregnated with at least one hydrocarbyl sulfonic acid containing at least two sulfonic groups per molecule, the resulting product is dried and baked.

11. The process of claim 10, wherein the product is additionally steamed in an inert gas stream.

* * * * *